United States Patent
Shibata

(10) Patent No.: US 7,256,687 B2
(45) Date of Patent: Aug. 14, 2007

(54) TIRE PNEUMATIC PRESSURE MONITORING SYSTEM AND TIRE PNEUMATIC PRESSURE MONITORING RECEIVER USED FOR TIRE PNEUMATIC PRESSURE MONITORING SYSTEM

(75) Inventor: Etsuya Shibata, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 219 days.

(21) Appl. No.: 11/076,174

(22) Filed: Mar. 9, 2005

(65) Prior Publication Data

US 2005/0156724 A1     Jul. 21, 2005

(30) Foreign Application Priority Data

Mar. 10, 2003  (JP)  ............... 2004-067841

(51) Int. Cl.
*B08C 23/02*  (2006.01)
(52) U.S. Cl. .............. 340/447; 340/445; 73/146.5; 73/146
(58) Field of Classification Search ........... 340/445, 340/447; 73/146, 146.5
See application file for complete search history.

(56) References Cited

U.S. PATENT DOCUMENTS 6,362,731 B1 *   3/2002   Lill ..................... 340/445
6,658,928 B1 *  12/2003   Pollack et al. ............ 73/146
6,744,357 B2 *   6/2004   Itou et al. ............... 340/445
6,861,942 B1 *   3/2005   Knapp et al. ............ 340/2.8
7,168,306 B2 *   1/2007   Hayashi ................. 73/146

FOREIGN PATENT DOCUMENTS

JP    2003-118333    4/2003
JP    2003-184376    7/2003

* cited by examiner

*Primary Examiner*—Jeffery Hofsass
*Assistant Examiner*—Anne V. Lai
(74) *Attorney, Agent, or Firm*—Brinks Hofer Gilson & Lione

(57) ABSTRACT

A tire pneumatic pressure monitoring system contains tire pneumatic pressure monitoring receivers that receive radio signals transmitted from sensors and detect RSSI signals and pneumatic pressure data. A console processes the RSSI signals and the pneumatic pressure data and outputs indicating signals. An indicator indicates the tire pneumatic pressure with the indicating signals. The tire pneumatic pressure monitoring receivers are individually provided corresponding to the tires of a vehicle. The console is provided with a level adjusting unit for adjusting output levels of the RSSI signals by controlling the tire pneumatic pressure monitoring receivers. The levels of the respective RSSI signals input to the console from the respective tire pneumatic pressure monitoring receivers are set approximately equal.

15 Claims, 3 Drawing Sheets

US 7,256,687 B2

TIRE PNEUMATIC PRESSURE MONITORING SYSTEM AND TIRE PNEUMATIC PRESSURE MONITORING RECEIVER USED FOR TIRE PNEUMATIC PRESSURE MONITORING SYSTEM

This application claims the benefit of Japanese Patent Application No. 2004-067841, filed on Mar. 10, 2004, which is incorporated herein by reference.

TECHNICAL FIELD

The present application relates to a tire pneumatic pressure monitoring system for monitoring the pneumatic pressure of tires in a vehicle, and a tire pneumatic pressure monitoring receiver used for the tire pneumatic pressure monitoring system.

BACKGROUND

A conventional tire pneumatic pressure monitoring system will be described with reference to FIG. 4. As shown in FIG. 4, sensors 11a to 11d are respectively provided in tire valves of respective tires 3a to 3d of a vehicle 2. Further, a monitoring system 12 is provided in the vehicle 2. The sensors 11a to 11d detect tire information, such as pneumatic pressure, temperature of the corresponding tires 3a to 3d, convert the tire information into radio signals and transmit the signals to the outside of the tires. In this case, the sensors 11a to 11d are designed to transmit the radio signals in different transmission patterns according to whether the pneumatic pressure and temperature of the tires 3a to 3d are normal or abnormal. Also, the respective sensors randomly intermittently transmit radio signals.

The monitoring system 12 has four receiving antennas 13a to 13d, a receiving set 14 and an indicator 15. The receiving set 14 has a receiving circuit 16 and a microcomputer 17. Also, the respective receiving antennas 13a to 13d are connected to the receiving circuit 16. The receiving circuit 16 demodulates radio signals into pulse signals and outputs them to the microcomputer 17. Also, a received signal strength indicator(RSSI) circuit is built in the receiving circuit 16, and the receiving circuit 16 outputs a received signal strength indicator signal (referred to as an RSSI signal) of radio signals received by the respective receiving antennas 13a to 13d to the microcomputer 17.

The microcomputer 17 comprises a CPU unit composed of CPU, ROM and RAM. Further, reference data such as pneumatic pressure and temperature of the tires 3a to 3d are stored in the microcomputer 17. The reference data indicates normal values of the pneumatic pressure and temperature of the tires 3a to 3d, and is set to be in a predetermined range. The indicator 15 is arranged within the vehicle 2, and indicates contents by a differential signal from the microcomputer 17 when abnormality occurs in the tires 3a to 3d.

Further, detecting units 18a to 18d are provided in the conduction paths between the respective antennas 13a to 13d, and the receiving circuit 16. These detecting units 18a to 18d are designed to respectively control availability of the reception of the corresponding receiving antennas 13a to 13d based on the differential signal from the microcomputer 17 (see Japanese Unexamined Patent Application Publication No. 2003-11833 (FIG. 5)). The control of such a system is complicated because the microcomputer controls availability of the reception of the detecting units.

SUMMARY OF THE INVENTION

A tire pneumatic pressure monitoring system comprises tire pneumatic pressure monitoring receivers for receiving radio signals transmitted from sensors provided in tires of a vehicle, and respectively detecting RSSI signals corresponding to the field intensities of the radio signals and at least pneumatic pressure data on the tires included in the radio signals, a console having the RSSI signals and the pneumatic pressure data input thereto for processing the pneumatic pressure data and outputting indicating signals, and an indicator for indicating the tire pneumatic pressure using the indicating signals, in which the tire pneumatic pressure monitoring receivers are individually provided corresponding to the plurality of tires of the vehicle, the console is provided with a level adjusting means for adjusting output levels of the RSSI signals by controlling the tire pneumatic pressure monitoring receivers, and the levels of the respective RSSI signals input to the console from the respective tire pneumatic pressure monitoring receivers are set approximately equal.

The level adjusting means includes a level detecting means for detecting the levels of the input RSSI signals, a memory having predetermined level values stored therein in advance, a level comparing means for comparing the detected RSSI signals with the predetermined level values, a gain control signal generating means for controlling gains of the tire pneumatic pressure monitoring receivers by outputting gain control signals according to the difference between the detected RSSI signals and the predetermined level values.

A tire pneumatic pressure monitoring receiver comprises a detecting means for receiving radio signals transmitted from sensors provided in tires of a vehicle, and respectively detecting RSSI signals corresponding to the field intensities of the radio signals and at least pneumatic pressure data on the tires included in the radio signals, and an amplifier for amplifying the RSSI signals, in which the amplifier is composed of a variable gain amplifier.

The variable gain amplifier has an OP amp and a plurality of feedback resistors having different resistance values, and the feedback resistors are switched by gain control signals.

In a tire pneumatic pressure monitoring system the tire pneumatic pressure monitoring receivers may be individually provided corresponding to the plurality of tires of the vehicle, and the console is provided with a level adjusting means for adjusting output levels of the RSSI signals by controlling the tire pneumatic pressure monitoring receivers, and the levels of the respective RSSI signals input to the console from the respective tire pneumatic pressure monitoring receivers are set approximately equal. Thus, as for the RSSI signals input to the console, the signals from the tire pneumatic pressure monitoring receivers as the output sources are always the greatest. Accordingly, when processing input data corresponding to the RSSI signals, corresponding tire pneumatic pressure information can be detected.

In an aspect, the level adjusting means may include a level detecting means for detecting the levels of the input RSSI signals, a memory having a predetermined level value stored therein in advance, a level comparing means for comparing the detected RSSI signals with the predetermined level values, and a gain control signal generating means for controlling gains of the tire pneumatic pressure monitoring receivers by outputting gain control signals according to the difference between the detected RSSI signals and the predetermined level values. Thus, the output levels of the respective RSSI signals can be made equal by adjusting gains of the respective tire pneumatic pressure monitoring receivers.

A tire pneumatic pressure monitoring receiver may comprise a detecting means for receiving radio signals transmitted from sensors provided in tires of a vehicle, and respectively detecting RSSI signals corresponding to the field intensities of the radio signals and at least pneumatic pressure data on the tires included in the radio signals, and an amplifier for amplifying the RSSI signals, in which the amplifier is comprised of a variable gain amplifier. Thus, the levels of RSSI signals can be adjusted.

Further, the variable gain amplifier may have an OP amp, and a plurality of the feedback resistors having different resistance values, in which the feedback resistors are switched by gain control signals. Thus, the level adjustment of RSSI signals can be simplified.

DETAILED DESCRIPTION

Exemplary embodiments may be better understood with reference to the drawings, but these embodiments are not intended to be of a limiting nature. Like numbered elements in the same or different drawings perform equivalent functions.

Figure 1:
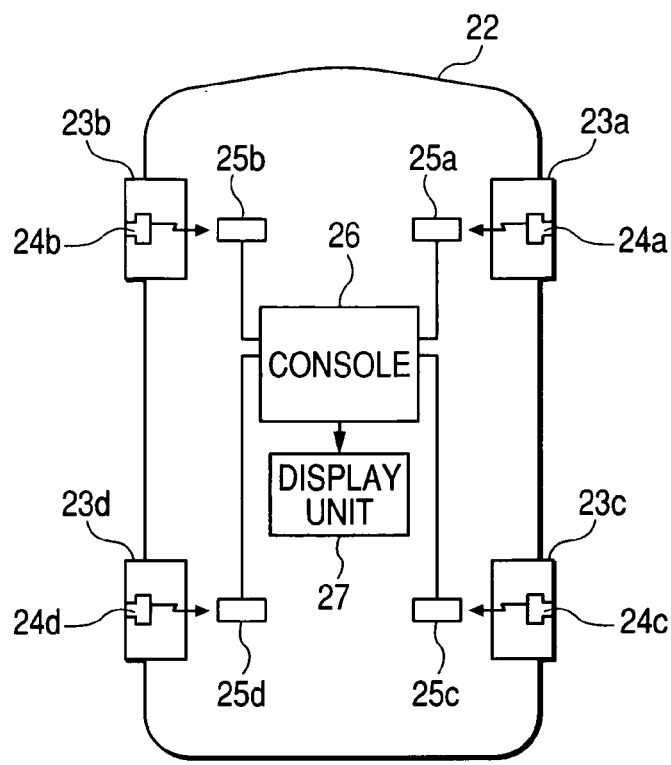
FIG. 1 is a view showing the structure of a tire pneumatic pressure monitoring system.

Aspects of a tire pneumatic pressure monitoring system and a tire pneumatic pressure monitoring receiver will now be described with reference to FIG. 1 to FIG. 3. First, in FIG. 1, tire valves of tires $23a$ to $23d$ of a vehicle 22 are respectively provided with sensors $24a$ to $24d$. Further, tire pneumatic pressure monitoring receivers (hereinafter, referred to as receivers) $25a$ to $25d$ disposed corresponding to the respective tires $23a$ to $23d$, a console 26 and an indicator 27 are provided in the vehicle 22.

The sensors $24a$ to $24d$ are designed to detect the pneumatic pressure and temperature of the respective corresponding tires $23a$ to $23d$ and convert the tire information into radio signals (for example, ASK-modulated signals of 315 MHz) which are transmitted outside the tires. The radio signals are randomly and intermittently transmitted from the respective sensors $24a$ to $24d$.

Figure 2:
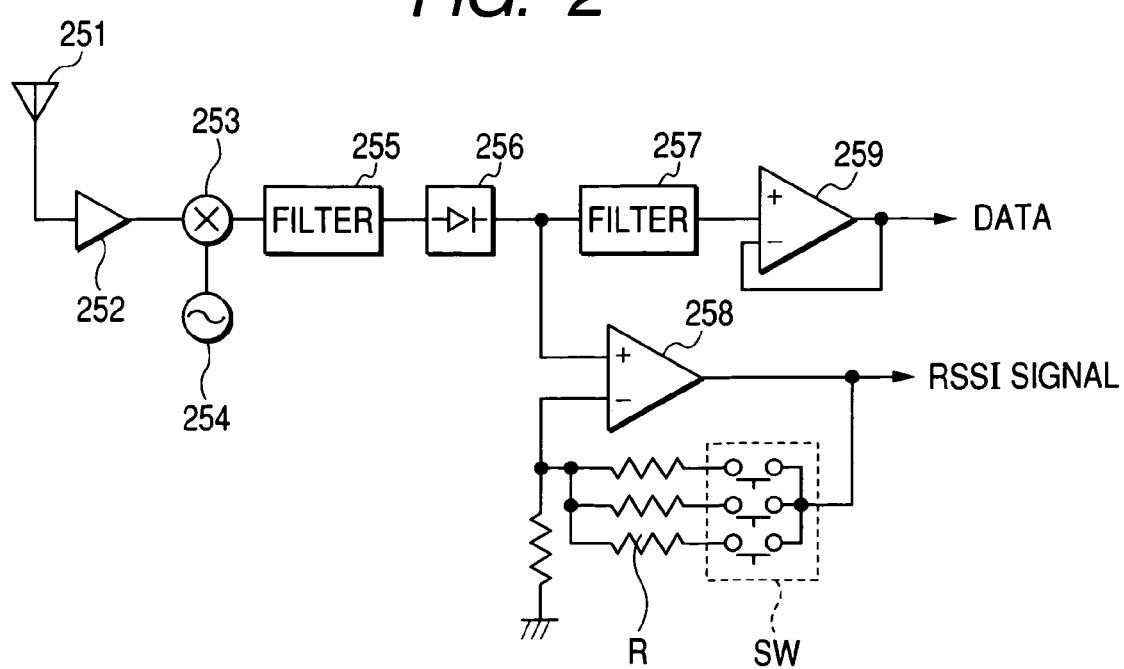
FIG. 2 is a circuit diagram of a tire pneumatic pressure monitoring receiver.

The receivers $25a$ to $25d$ have the same structure, and as shown in FIG. 2, has an antenna 251, a high-frequency amplifier 252, a mixer 253 which frequency-converts an amplified radio signal into an intermediate frequency signal (for example, a frequency of 10.7 MHz), an oscillator 254 which supplies a local oscillation signal to the mixer 253, an intermediate frequency filter 255 which passes an intermediate frequency-band signal, a detector 256 which detects an intermediate frequency signal, a base band filter 257 and an RSSI signal amplifier 258 which are connected to the detector 256 output, and an output amplifier 259 which is connected to the output of the base band filter 257.

A base band signal is output from the detector 256 and the waveform of the output signal is shaped by the base band filter 257, and data indicating tire information, such as tire pneumatic pressure and temperature, is output via an output amplifier 259. Meanwhile, since the base band signal output from the detector 256 is proportional to the field intensity of the radio signal, the base band signal is converted into a RSSI signal and output via the RSSI signal amplifier 258. In other words, RSSI signals proportional to the field intensity of radio signals, and data including the information on the pneumatic pressure and temperature of the tires are output from the respective receivers $25a$ to $25d$ and individually input to a console 26. In addition, the RSSI signal amplifier 258 has an OP amp (operational amplifier) whose gain is set by selecting a feedback resistor connected between an output terminal of the RSSI signal amplifier 258 and one input terminal thereof. A selectable switching means SW whose control method will be described later is controlled by the console 26.

Figure 3:
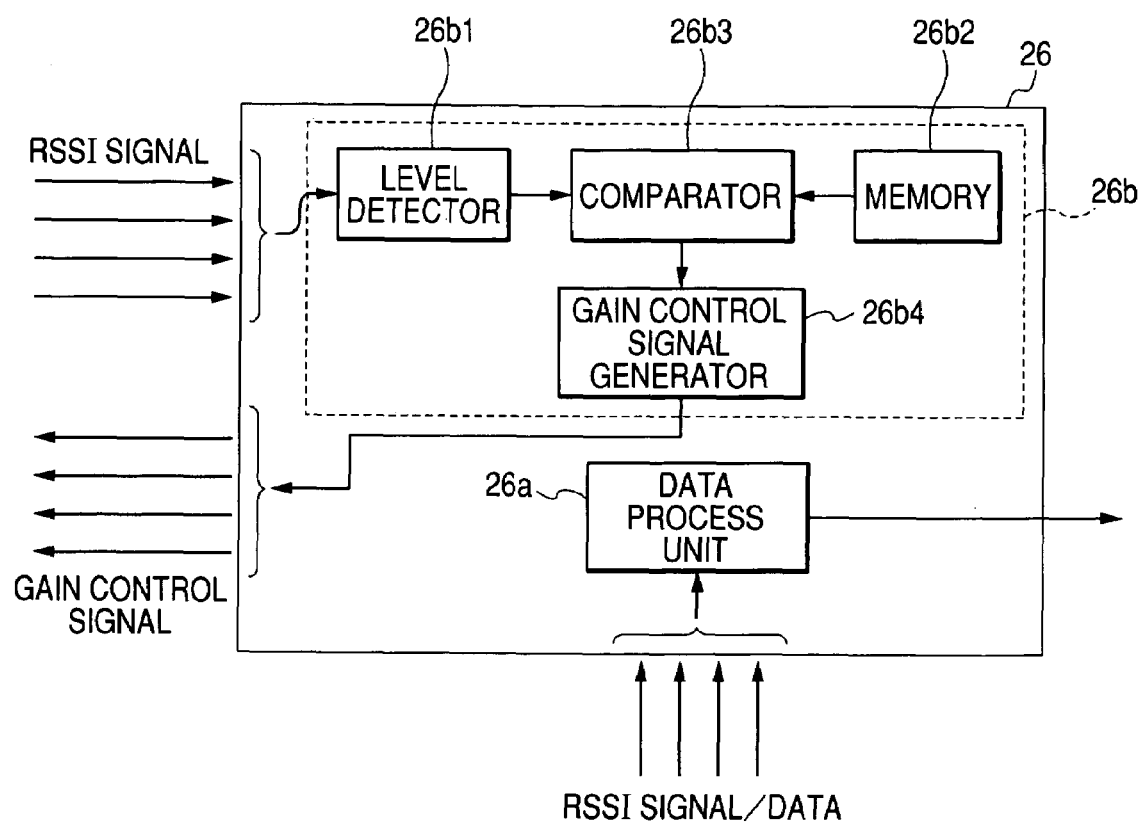
FIG. 3 is a block diagram of a console in the tire pneumatic pressure monitoring.
Figure 4:
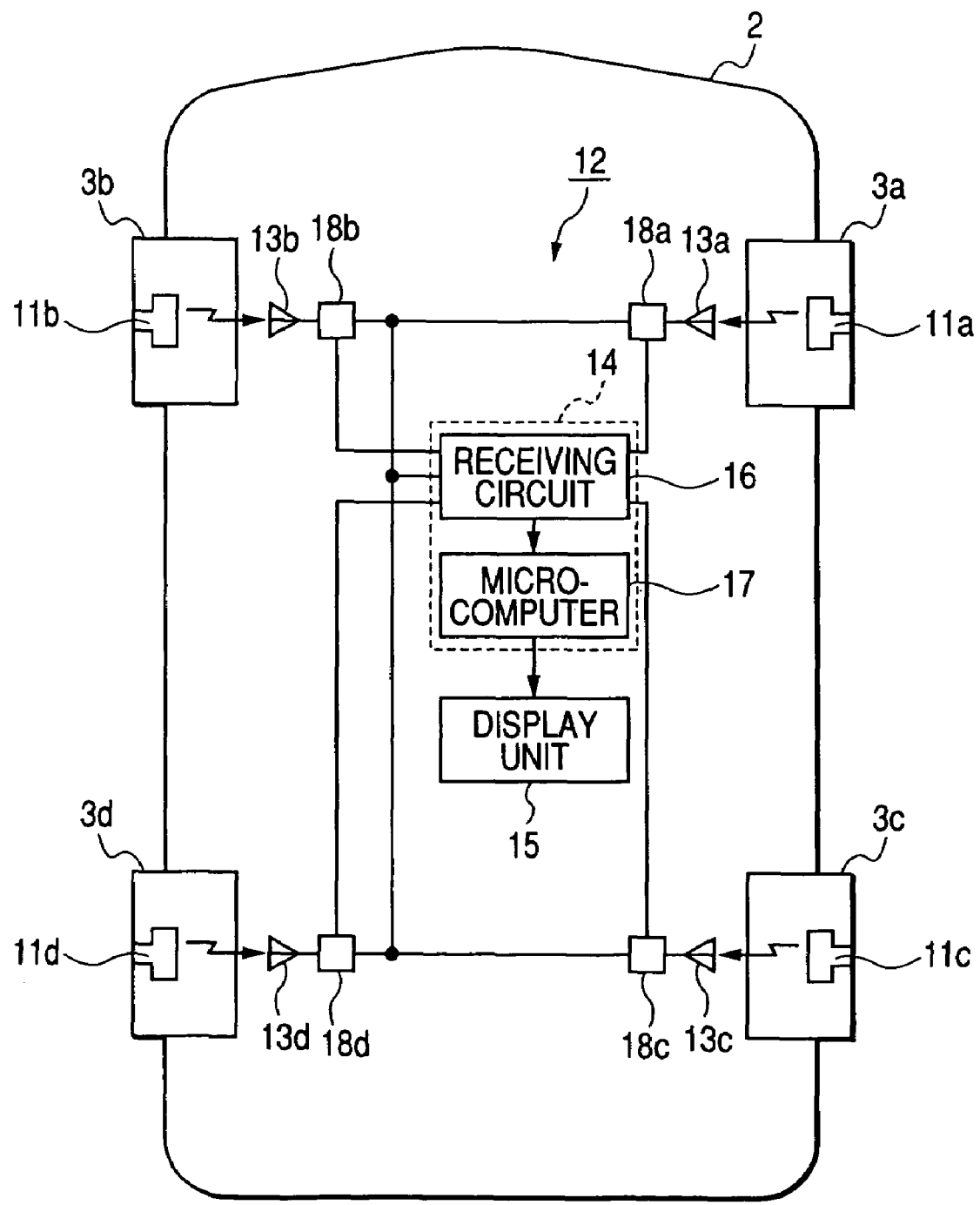
FIG. 4 is a view showing the structure of a conventional tire pneumatic pressure monitoring system.

As shown in FIG. 3, the console 26 has a data processing unit $26a$, such as a microcomputer, which processes input data to calculate the pneumatic pressure and temperature of the tires, and then outputs the results to the indicator 27, and a level adjusting means $26b$ for adjusting the level of the RSSI signal input from the respective receivers $25a$ to $25d$. The level adjusting means $26b$ has a level detecting means $26b1$, a memory $26b2$, a comparing means $26b3$, and a gain control signal generating means $26b4$.

When a vehicle is in use, if data and RSSI signals from the respective receivers $25a$ to $25d$ are individually input to the console 26 at a random timing, the console 26 detects an RSSI signal from one of the receivers avoiding overlapping of timing by appropriate processing. Then, the data processing unit $26a$ processes only the data corresponding to the RSSI signal, outputs indicating signals for indicating the pneumatic pressure and temperature of the tires to the indicator 27.

If the respective receivers $25a$ to $25d$ exhibit variations in gains, a receiver having a higher gain may receive a radio signal from a sensor in a tire which does not correspond to the receiver and output a corresponding RSSI signal and data, even though the field intensities of radio signals output from the respective sensors $24a$ to $24d$ are approximately equal. However, if the gains of the respective receivers $25a$ to $25d$ are kept approximately constant, the respective receivers $25a$ to $25d$ can output the RSSI signals based on the radio signals from the corresponding sensors at their maximum levels (greater than RSSI signals of other sensors received by the receiver).

From the foregoing, the RSSI signal amplifier 258 which can change the level of an output RSSI signal is provided in each of the receivers $25a$ to $25d$ so as to keep the output level of the respective receivers constant by adjusting gains in the RSSI signal amplifier.

The method of adjusting gains in the receivers $25a$ to $25d$ is described. First, a predetermined level value (reference value) as a target level of a RSSI signal is stored in the memory $26b2$ in the level adjusting means $26b$ of the console 26. The reference value is set to be a predetermined range. Also, in a state in which the respective receivers $25a$ to $25d$ are mounted on the vehicle 22 corresponding to the respective tires $23a$ to $23d$, the respective sensors $24a$ to $24d$ output radio signals for adjustment one by one, and the output signals are individually input to the level adjusting means $26b1$. The level of the RSSI signal output from a corresponding receiver is read by the level detecting means $26b1$ and is compared with the reference value by the comparing means $26b3$. The difference therebetween is supplied to the control signal generating means $26b4$, and the control signal generating means $26b4$ outputs a gain control signal which is, for instance, analog-to-digital converted. The gain control signal is supplied to the switching means SW of the receivers $25a$ to $25d$. The level adjusting means $26b$ is used for adjusting/setting gains in the respective receivers $25a$ to $25d$, but is not used for adjusting/setting gains when a vehicle is in use after the adjustment.

As a consequence of the adjustment, gains from the antenna 251 of the receivers 25a to 25d to the output terminal of the RSSI signal amplifier 258 become approximately equal, and the respective receivers 25a to 25d output maximized RSSI signals based on radio signals from the corresponding sensors. Therefore, the maximum RSSI signal input to the console 26 is from the receiver corresponding to the desired tire sensor.

Although the present invention has been explained by way of the example described above, it should be understood to the ordinary skilled person in the art that the invention is not limited thereby, but rather that various changes or modifications thereof are possible without departing from the spirit of the invention. Accordingly, the scope of the invention shall be determined only by the appended claims and their equivalents.

What is claimed is:

1. A pneumatic pressure monitoring system comprising:
    a plurality of tire pneumatic pressure monitoring receivers for receiving radio signals transmitted from sensors provided in tires of a vehicle, and respectively detecting corresponding received signal strength indicator (RSSI) signals corresponding to the field intensities of the radio signals and detecting pneumatic pressure data of the tires included in the radio signals;
    a console configured to receive the RSSI signals and the pneumatic pressure data and process the pneumatic pressure data;
    an indicator for indicating the tire pneumatic pressure;
    respective monitoring receivers providing an RSSI signal corresponding to a respective tire of the plurality of tires of the vehicle;
    wherein the console is provided with a level adjusting means for adjusting output levels of the RSSI signals by controlling the tire pneumatic pressure monitoring receivers; and
    wherein the levels of the respective RSSI signals input to the console from the respective tire pneumatic pressure monitoring receivers are set approximately equal.

2. The tire pneumatic pressure monitoring system according to claim 1, wherein the level adjusting means includes:
    a level detecting means for detecting the levels of the input RSSI signals;
    a memory having predetermined level values stored therein;
    a level comparing means for comparing the detected RSSI signals with the predetermined level values; and
    a gain control signal generating means for controlling gains of the tire pneumatic pressure monitoring receivers by outputting gain control signals according to the difference between the detected RSSI signals and the predetermined level values.

3. A tire pneumatic pressure monitoring receiver comprising:
    a detecting means for receiving a radio signal transmitted from a sensor provided in a tire of a vehicle, and for detecting a received signal strength indicator (RSSI) signal corresponding to the field intensity of the radio signal and pneumatic pressure data of the tire included in the radio signal; and
    a variable gain amplifier in the receiver for amplifying the RSSI signals, the receiver responsive to control signals for varying a gain of the amplifier such that the RSSI signal strength is within a predetermined range.

4. The tire pneumatic pressure monitoring receiver according to claim 3,
    wherein the variable gain amplifier has an operational amplifier and a plurality of feedback resistors having different resistance values, and
    wherein the feedback resistors are switched by gain control signals.

5. A vehicular tire pneumatic pressure monitoring system comprising:
    a tire pressure sensor attached to a tire of a vehicle, the sensor transmitting a radio signal representing pneumatic pressure data;
    a tire pneumatic pressure monitoring receiver corresponding to the tire pressure sensor, the tire pneumatic pressure monitoring receiver supplying an output signal representing the field intensity of a received radio signal; and
    a microprocessor configured to adjust a gain of the monitoring receiver so that the output signal for the corresponding tire pressure sensor radio signal is transmitted at approximately a predetermined level.

6. The system according to claim 5, wherein a plurality of tire pressure sensors is associated with an equal number of tire pressure monitoring receivers.

7. The system according to claim 6, wherein each of the plurality of the tire pressure monitoring receivers is disposed on the vehicle such that a particular tire pneumatic pressure monitoring receiver receives a maximum field intensity from one of the plurality of tire pressure sensors, in the state where the tire is attached to the vehicle.

8. The system according to claim 6, wherein each of the plurality of the tire pressure monitoring receivers is disposed on the vehicle such that the particular tire pneumatic pressure monitoring receiver receives a maximum field intensity from one of the plurality of tire pressure sensors, in the state where the tire is attached to a vehicle axle.

9. The system according to claim 8, wherein the gain of each of the tire pressure monitoring receivers is adjusted such that the output signal is approximately the same predetermined level.

10. The system according to claim 5, wherein the adjusting the receiver gain is performed when the vehicle is stationary.

11. The system according to claim 5, wherein the radio signal includes temperature information.

12. The system according to claim 5, wherein an indicator is provided to display pneumatic pressure data.

13. The system according to claim 5, wherein a tire pressure sensor is provided in each tire.

14. A method of measuring tire properties, the method comprising:
    providing a tire pressure sensor in a tire, the tire pressure sensor transmitting a radio signal representing tire pressure;
    providing a tire pressure monitoring receiver associated with a tire mounting position on the vehicle;
    receiving the transmitted radio signal and producing an output signal having a measure of a received field intensity;
    adjusting the output signal such that the measure of the received field intensity is approximately a predetermined value.

15. The method of claim 14, wherein the adjusting the output signal is performed when the vehicle is stationary.

* * * * *